United States Patent
Tanaka et al.

[19]

[11] Patent Number: 6,094,718
[45] Date of Patent: Jul. 25, 2000

[54] PROGRAMMABLE CONTROLLER WITH A BPU THAT EXECUTES FIRST-CLASS INSTRUCTIONS, A CPU THAT EXECUTES SECOND-CLASS INSTRUCTIONS, AND A SKIP INSTRUCTION PROCESSING SECTION THAT SKIPS THE CURRENT INSTRUCTION WITHOUT TRANSFERRING CONTROL RIGHT TO CPU

[75] Inventors: Youichi Tanaka, Neyagawa; Futoshi Nakai, Kobe; Tatsuo Masuda, Matsubara, all of Japan

[73] Assignee: Matsushita Electric Works, Ltd., Osaka, Japan

[21] Appl. No.: 09/026,341

[22] Filed: Feb. 19, 1998

[30]    Foreign Application Priority Data

Feb. 26, 1997  [JP]  Japan ..................................... 9-041909

[51] Int. Cl.⁷ ...................................................... G06F 9/44
[52] U.S. Cl. ................................ 712/34; 700/2; 712/226; 712/245
[58] Field of Search ............................. 364/131; 712/34, 712/226, 245; 700/2

[56] References Cited

U.S. PATENT DOCUMENTS 3,577,190  5/1971  Cocke ...................................... 712/226
5,440,724  8/1995  Boothroyd et al. ...................... 714/733
5,517,436  5/1996  Andreas et al. ......................... 708/524
5,553,297  9/1996  Yonezawa et al. ....................... 700/18
5,704,052  12/1997  Wu et al. ............................... 712/204

FOREIGN PATENT DOCUMENTS 3237502  10/1991  Japan .

OTHER PUBLICATIONS

An English Language translation of an examination report issued by the German Patent Office dated Feb. 22, 1999.

*Primary Examiner*—Kenneth S. Kim
*Attorney, Agent, or Firm*—Greenblum & Bernstein, P.L.C.

[57]    ABSTRACT

A programmable controller includes a BPU that executes first-class instructions, a CPU that executes second-class instructions, and a memory that is shared by the BPU and the CPU and stores a program, which is formed of a combination of first-class and second-class instructions. The programmable controller also includes a judgment-data storage section that stores judgment data for judging whether a second-class instruction is a skippable instruction or not, and a skip processing section that judges whether the operation result of the preceding instruction satisfies a skip condition or not. If judging that the operation result satisfies the skip condition, then the skip processing section judges whether a current instruction of the second class is a skippable instruction or not, based on the above judgment data, and skips the current instruction without transferring control right to the CPU, if the current instruction is a skippable instruction.

12 Claims, 8 Drawing Sheets

| ADDRESS | | |
|---|---|---|
| 100 | BASIC INSTRUCTION1 | 0 |
| 101 | BASIC INSTRUCTION2 | 0 |
| 102 | BASIC INSTRUCTION3 | 0 |
| 103 | BASIC INSTRUCTION4 | 0 |
| 104 | BASIC INSTRUCTION5 | 0 |
| 105 | APPLN INSTRUCTION1 | 1 |
| 106 | BASIC INSTRUCTION6 | 0 |
| 107 | BASIC INSTRUCTION7 | 0 |
| 108 | APPLN INSTRUCTION2 | 1 |
| 109 | APPLN INSTRUCTION3 | 0 |
| 110 | BASIC INSTRUCTION8 | 0 |
| 111 | BASIC INSTRUCTION9 | 0 |

PROGRAMMABLE CONTROLLER WITH A BPU THAT EXECUTES FIRST-CLASS INSTRUCTIONS, A CPU THAT EXECUTES SECOND-CLASS INSTRUCTIONS, AND A SKIP INSTRUCTION PROCESSING SECTION THAT SKIPS THE CURRENT INSTRUCTION WITHOUT TRANSFERRING CONTROL RIGHT TO CPU

BACKGROUND OF THE INVENTION

1. Field of the Invention

The present invention relates to programmable controllers and particularly speed-up of programmable controllers using multi-processor technology.

2. Description of the Related Art

Figure 10:
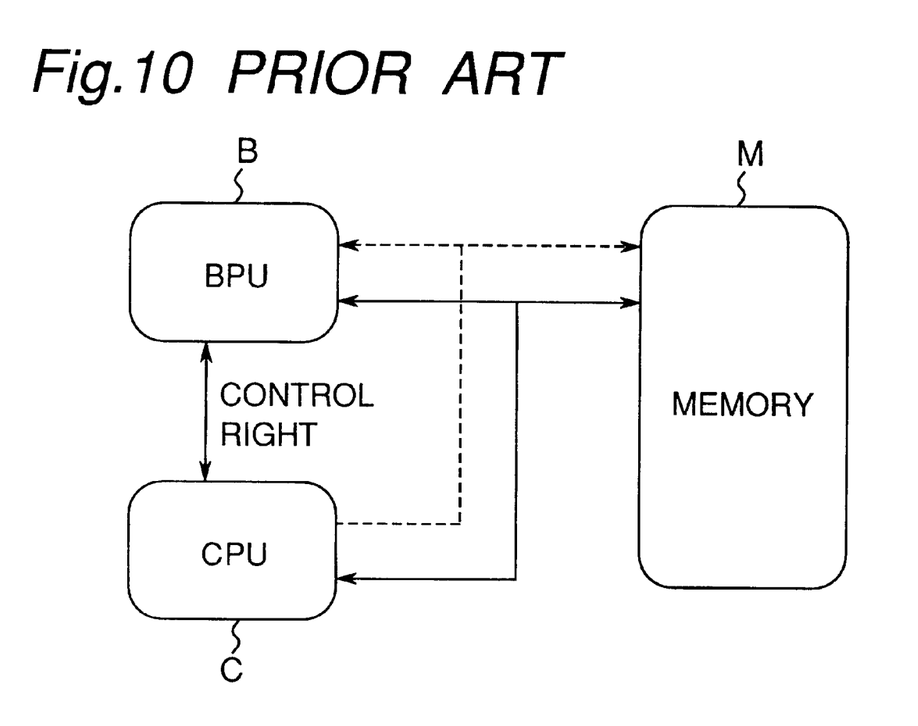
FIG. 10 is a block diagram of a prior art programmable controller.

So far, as a programmable controller using multi-processor technology, there has been one illustrated in FIG. 10. Referring to FIG. 10, in the programmable controller, a bit processing unit (abbreviated to BPU hereafter) B and a central processing unit (abbreviated to CPU) C share a memory M, an address bus, and a data bus. A program stored in memory M is formed of a combination of instructions of a first class executed by BPU B and instructions of a second class executed by CPU C. BPU B primarily has control right in executing the program and transfers control right to CPU C when a second-class instruction is executed. Then CPU C executes the second-class instruction. The second class of instructions includes skippable instructions that can be skipped if the preceding instruction is a first class instruction and a certain skip condition is met for the operation result of the preceding first-class instruction. When CPU C receives control right together with a second-class instruction, and if the instruction is a skippable instruction, CPU C refers to the operation result of the preceding instruction to judge whether the operation result satisfies the skip condition or not. If CPU C judges that the operation result satisfies the skip condition, and if the next instruction belongs to the first class, then CPU C returns control right to BPU B.

As described above, in such a prior art programmable controller, CPU C always succeeds control right without condition, if the current instruction belongs to the second class. A program consists of various instructions of both first and second classes and generally contains many skippable instructions. Therefore, speed-up of execution has been hampered by transferring control right many times.

SUMMARY OF THE INVENTION

The basic object of the present invention is therefore to provide a programmable controller that allows speedy operations. A more concrete object is to provide a programmable controller that allows speedy processing of skippable instructions.

In order to achieve the aforementioned objects, according to one aspect of the present invention, there is provided a programmable controller that has a BPU that executes the operations of first-class instructions, a CPU that executes the operations of second-class instructions, and a memory that is shared by the BPU and the CPU and stores a program, which is formed of a combination of first-class instructions and second-class instructions. Second class instructions include skippable instructions that can be skipped if the operation result of a preceding first-class instruction satisfies a predetermined skip condition. The first-class instructions mainly instruct on bitwise operations, while the second-class instructions mainly instruct on bytewise operations. The bytewise operations may, however, be replaced with operations executed in units of a predetermined length such as, for example, word, double-word or the like. The programmable controller further has a judgment-data storage section that stores judgment data for judging whether a current instruction of the second class is a skippable instruction or not and a skip processing section that judges whether the operation result of a preceding first-class instruction satisfies a skip condition or not. If judging that the operation result satisfies the skip condition, then the skip processing section judges whether the current instruction of the second class is a skippable instruction or not, based on the above judgment data. If judging that the operation result satisfies the skip condition and that the current instruction is a skippable instruction, then the skip processing section skips the current instruction without transferring control right to the CPU.

The judgment-data storage section stores judgment data by which the skip processing section can judge whether a second-class instruction is a skippable instruction or not based on the address at which the instruction is stored. This judgment-data storage section can be installed in the BPU. Alternatively, a second memory separated from the BPU and accessible by the BPU can be added, and the judgment-data storage section is installed therein. In another variant, a free memory area of the memory in which programs are stored can be used.

The judgment data may have addresses one-to-one corresponding to the address of the second-class instructions, but the one-to-one correspondence is not always necessary. It suffices that the judgment data has a data structure that allows the skip processing section to judge whether an instruction is a skippable instruction or not, based on the address of the instruction.

The skip processing section judges whether an instruction is a skippable instruction or not and whether the instruction can be actually skipped or not, based on the judgment data and the operation result. If the skip processing section judges that an instruction can be actually skipped, then the skip processing section skips the instruction without transferring control right to the CPU to execute the next instruction. The skip processing section can be formed of a program built in the BPU, but also can be built within the BPU as hardware.

According to the present invention, if a skippable instruction can be actually skipped, then the instruction is skipped without transferring control right to the CPU. Therefore, skip processing is sped up, and the time for executing a program is definitely shortened.

BRIEF DESCRIPTION OF THE DRAWINGS

These and other objects and features of the present invention will become clear from the following description taken in conjunction with the preferred embodiments thereof and the accompanying drawings throughout which like parts are designated by like reference numerals, and in which:

FIG. 9c is another address corresponding to the address of FIG. 9a;

DETAILED DESCRIPTION OF THE PREFERRED EMBODIMENTS

This application is based on patent application No. HEI9-41909 filed in Japan, the content of which is incorporated hereinto by reference.

Figure 1:
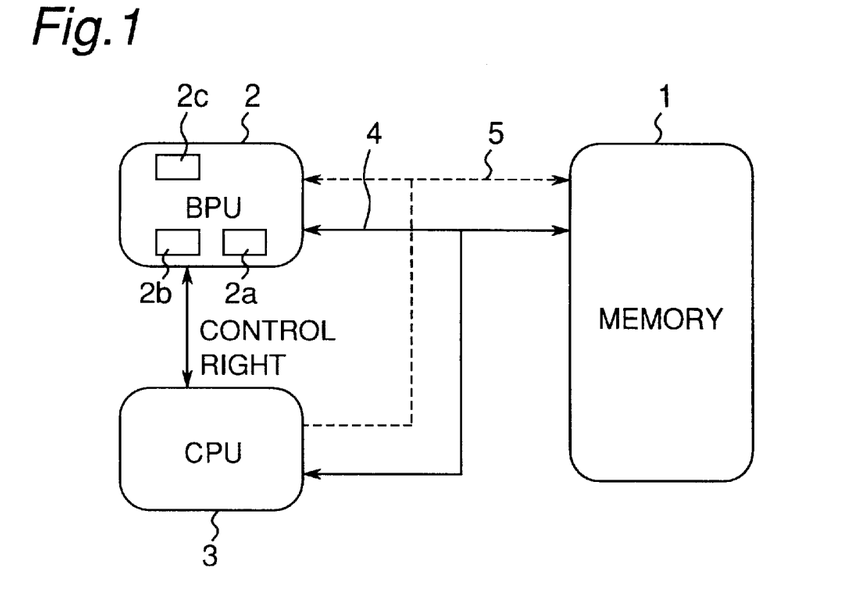
FIG. 1 is a block diagram of a first embodiment in accordance with the present invention.
Figure 2:
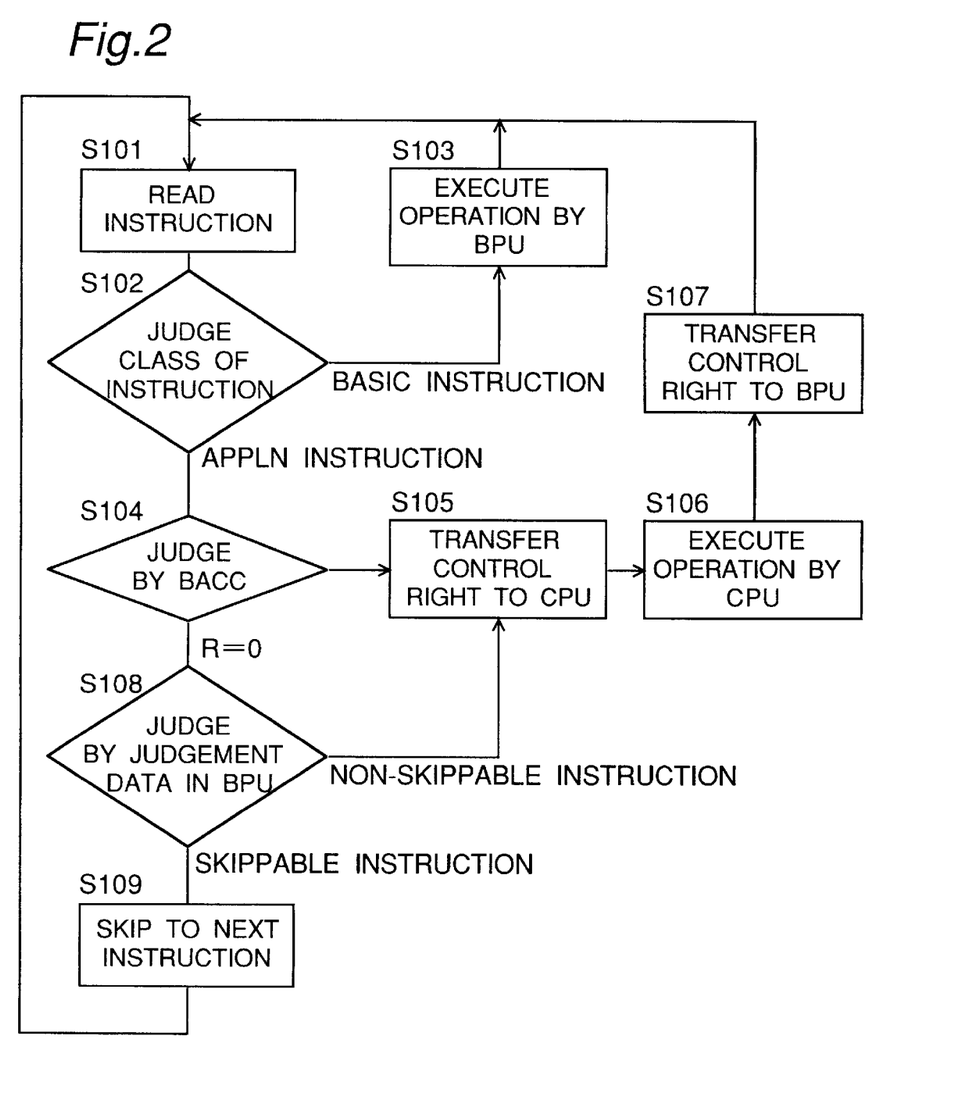
FIG. 2 is a flowchart that illustrates operations executed by the BPU of the first embodiment.

The first embodiment according to the present invention is described below in conjunction with FIGS. 1, 2, and 3. Referring to FIG. 1, a programmable controller has memory 1, BPU (bit processing unit) 2, and CPU (central processing unit) 3.

Memory 1 stores a program that is formed of a combination of first-class instructions and second-class instructions ordered in any way. First-class instructions are processed by BPU 2 and instruct BPU 2 on relatively simple basic operations, mainly bitwise operations. Second-class instructions are processed by CPU 3 and instruct CPU 3 on relatively complex application operations, such as bytewise operations, data conversion, and data transfer. Further, the second-class instructions include skippable instructions whose operations can be skipped, if the operation result of a preceding first-class instruction satisfies a predetermined skip condition.

BPU 2 is a processor that executes a bitwise operation and connected to memory 1 through a data bus 4 and an address bus 5. BPU 2 executes the operation of a first-class instruction stored in memory 1, when obtaining control right that is transferred between BPU 2 and CPU 3. BPU 2 has a judgment-data storage section 2a, a BACC (bit accumulator) 2b, and a skip processing section 2c. The judgment-data storage section 2a is a table that stores judgment data for judging whether a second-class instruction following the execution of a first-class instruction is a skippable instruction or not, by referring to the address at which the second-class instruction is stored. BACC 2b holds the operation result R of the first-class instruction obtained from the execution of the instruction by BPU 2. Skip processing section 2c judges whether the operation result R of the first-class instruction satisfies the predetermined skip condition or not. If judging that the operation result R satisfies the skip condition, then skip processing section 2c further judges whether the second-class instruction is a skippable instruction or not, based on the judgment data. If the second-class instruction is a skippable instruction, then skip processing section 2c performs the processing of skipping the second-class instruction without transferring control right to CPU 3.

CPU 3 is connected to memory 1 through data bus 4 and address bus 5. When obtaining control right, CPU 3 executes a second-class instruction stored in memory 1.

Next, the operation of BPU 2 proper and skip processing section 2c installed therein is described with reference to FIG. 2. BPU 2 reads out an instruction stored in memory 1 together with the address at which the instruction is stored (step S101). Then BPU 2 judges whether the instruction is a basic instruction of the first class or an application instruction of the second class (step S102). If the instruction is a basic instruction, then BPU 2 executes the operation of the instruction (step S103). If the instruction is an application instruction, then skip processing section 2c judges whether the instruction should be executed, that is, whether it satisfies the skip condition or not, depending on the binary value of the operation result R retained in BACC 2b (step S104). The value 0 of the operation result R indicates that the second-class instruction can be skipped if it is a skippable instruction, that is, the skip condition is satisfied. The value 1 of the operation result R indicates that the second-class instruction can not be skipped, even if it is a skippable instruction. Therefore, if the operation result R retained in BACC 2b is 1, then skip processing section 2c judges that the application instruction should be executed, and BPU 2 transfers control right to CPU 3 (step S105). CPU 3 then executes the operation of the application instruction (step S106) and transfers control right back to BPU 2 (step S107).

On the other hand, if the operation result R retained in BACC 2b is 0, then skip processing section 2c judges that the application instruction can be skipped without being executed, that is, the skip condition is met, and judges whether the application instruction is a skippable instruction or not, based on judgment data stored in judgment-data storage section 2a (step S108). Here the address at which the instruction is stored in memory 1 is the same as the address in judgment-data storage section 2a at which the judgment data for the instruction is stored, so that skip processing section 2c only needs to refer to the judgment data stored at the address.

If skip processing section 2c judges that the application instruction is not a skippable instruction in step S108, then BPU 2 transfers control right to CPU 3 (step S105). In this case, CPU 3 then executes the operation of the application instruction (step S106) and transfers control right back to BPU 2 (step S107). If skip processing section 2c judges that the application instruction is a skippable instruction in step S108, then the instruction is skipped (step S109).

Figure 3:
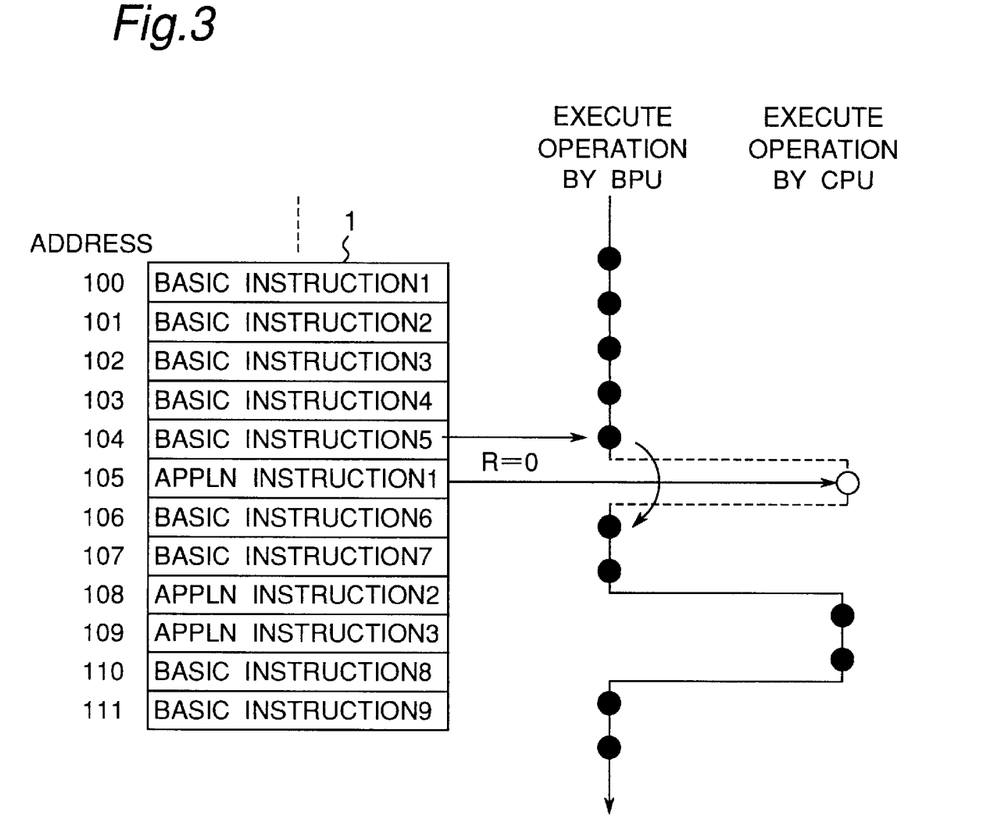
FIG. 3 illustrates the skipping of an instruction in the first embodiment.

FIG. 3 shows an example how instructions are stored from address 100. Referring to FIG. 3, BPU 2 skips the application instruction stored at address 105, after executing the operation of the basic instruction stored at address 104.

In such a programmable controller described above, whether a second-class instruction following a first-class instruction is a skippable instruction or not is judged by BPU 2 based on the judgment data stored in judgment-data storage section 2a. Further, if the second-class instruction is judged to be a skippable instruction, then control right is neither transferred from BPU 2 to CPU 3, nor transferred back from CPU 3 to BPU 2. Therefore, the time consumed for transferring control right is saved, and the execution of a program is sped up.

Also, judgment-data storage section 2a is installed within BPU 2. Therefore, a dedicated memory for installing judgment-data storage section 2a is not necessary.

Figure 4:
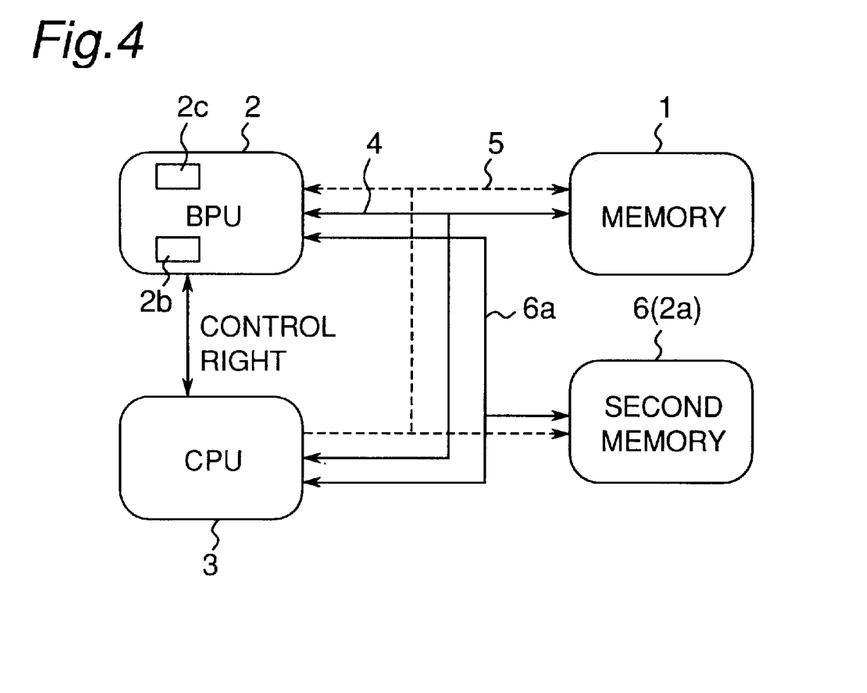
FIG. 4 is a block diagram of a second embodiment in accordance with the present invention.
Figure 5:
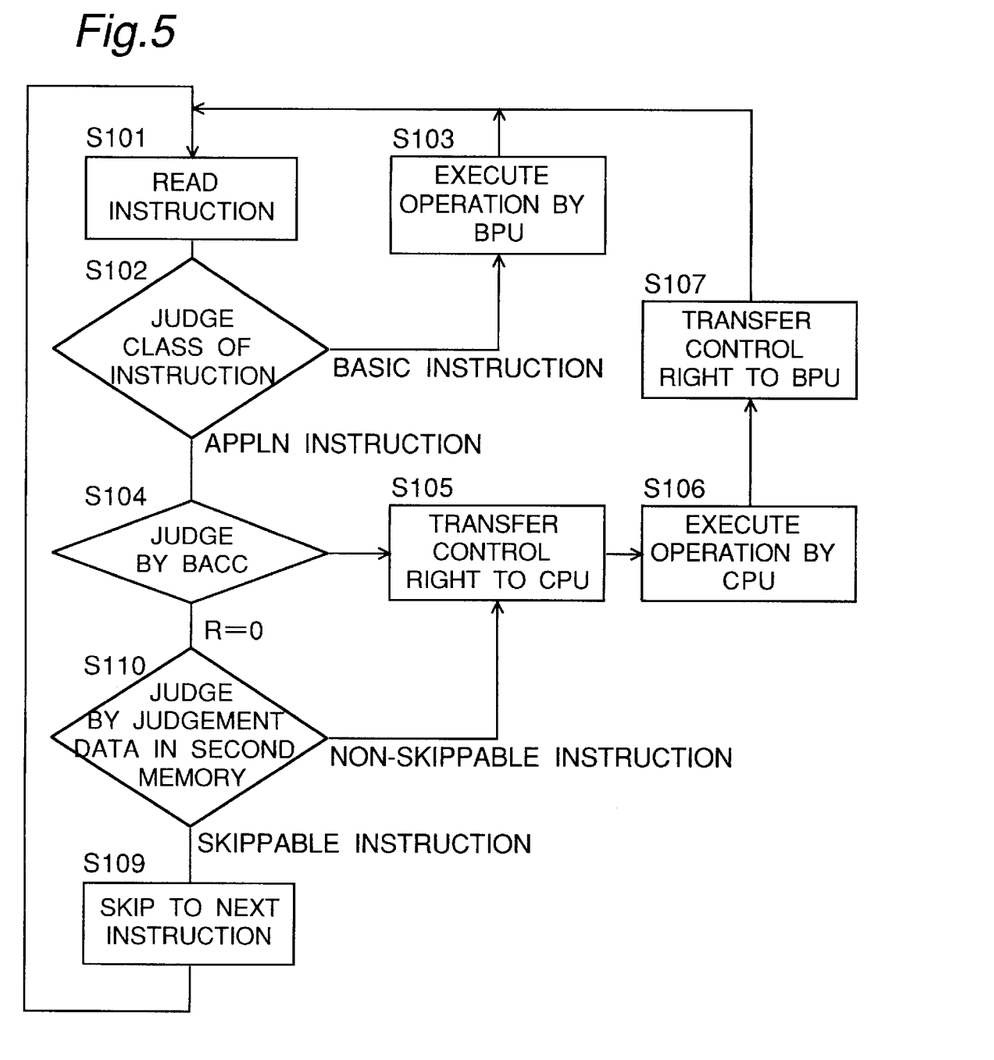
FIG. 5 is a flowchart that illustrates operations executed by the BPU of the second embodiment.
Figure 6:
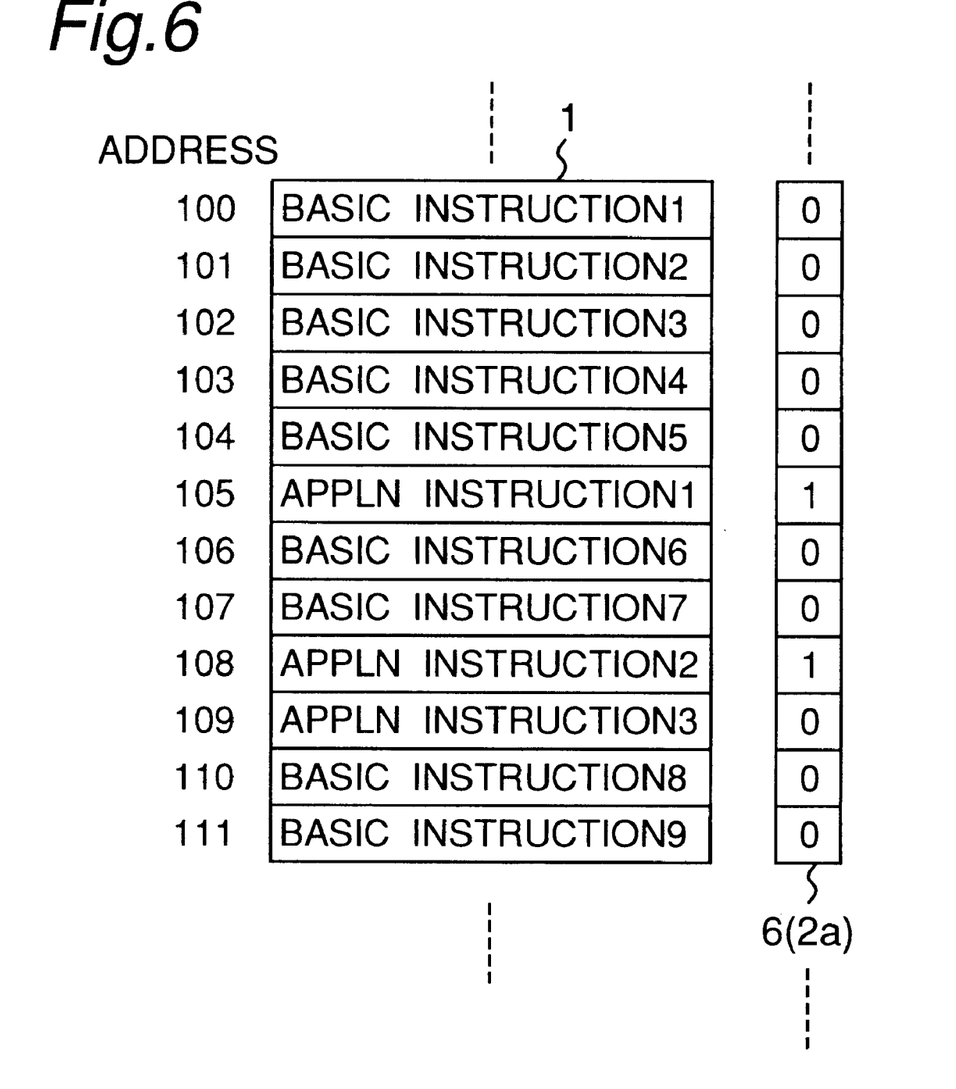
FIG. 6 illustrates a storage state of judgment data in the second memory of the second embodiment.

Next, the second embodiment according to the present invention is described below in conjunction with FIGS. 4, 5, and 6. Components that function substantially the same as in the first embodiment are denoted by the same reference numerals, and things different from the first embodiment are only described. While judgment-data storage section 2a is installed within BPU 2 in the first embodiment, the judgment-data storage section 2a of the present embodiment is formed of a second memory 6 that is connected to BPU 2 and CPU 3 through a 1-bit data bus 6a so that the judgement data can be read out.

Specifically, second memory 6 is a memory that is 1 bit length and stores the judgment data at the same addresses at which the corresponding instructions are stored in memory 1. Incidentally, the value 0 of judgment data at an address indicates that the corresponding application instruction is a skippable instruction; the value 1 of judgment data at an address indicates that the corresponding application instruction is not a skippable instruction.

Next, the operation of BPU 2 is described with reference to FIG. 5. Based on judgment data stored in judgment-data storage section 2a, which is second memory 6, the skip processing section 2c in BPU 2 judges whether a current application instruction is a skippable instruction or not (Step S110). The other part of the flow in FIG. 5 is the same as the flow in the first embodiment illustrated in FIG. 2.

In such a programmable controller described above, the execution of a program is sped up as in the first embodiment. Also, judgment-data storage section 2a is installed in second memory 6, which is connected to and read by BPU 2. Therefore, judgment data can be stored without being restricted by a prior construction. Further, the size of the programmable controller can be made compact, since the second memory 6 is only 1 bit length.

Next, the third embodiment according to the present invention is described below in conjunction with FIGS. 7, 8, and 9a–9d. Components that function substantially the same as in the first embodiment are denoted by the same reference numerals, and only things different from the first embodiment are described. While judgment-data storage section 2a is installed within BPU 2 in the first embodiment, the judgment-data storage section 2a of the present embodiment is installed in memory 1.

Figure 8:
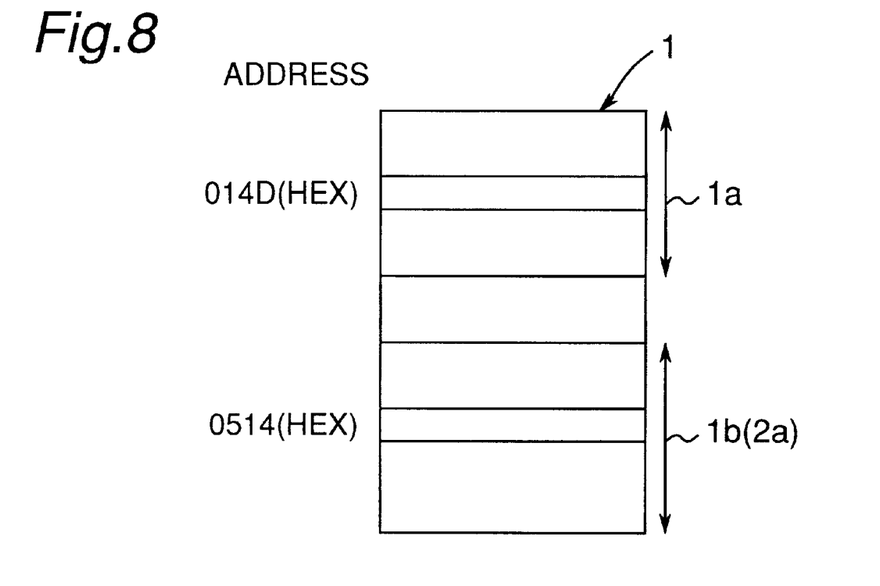
FIG. 8 illustrates the judgment-data storage section in the memory of the third embodiment.

Specifically, memory 1 has an instruction storage area 1a in which first-class and second class instructions are stored and a judgment-data storage area 1b in which judgment data is stored. The judgment-data storage area 1b is an area of addresses greater than the offset value described below. Judgment data for each instruction is stored at an address calculated from the address at which the instruction is stored.

Figure 9A:
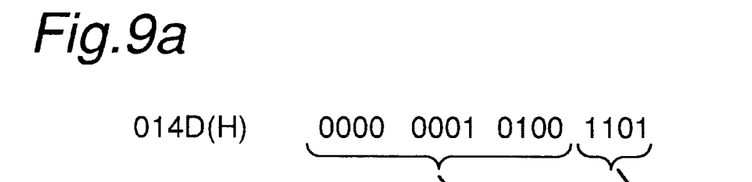
FIG. 9a is an address represented by the hexadecimal notation and that represented by the binary notation, when judgment data for each instruction is extracted.
Figure 9B:
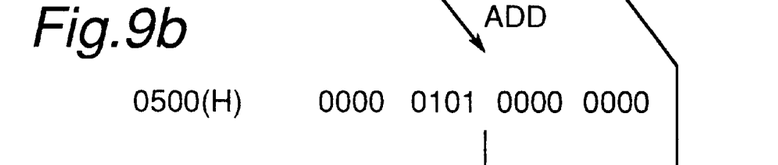
FIG. 9b is an offset value represented by the hexadecimal notation and that represented by the binary notation, when judgment data for each instruction is extracted.
Figure 9C:
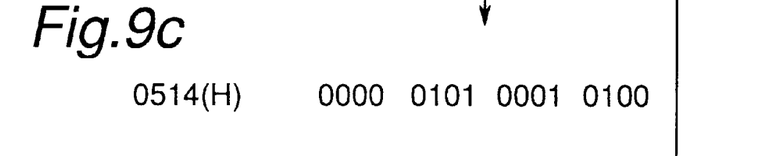

Next, a procedure of extracting judgment data for each instruction is described with reference to FIGS. 8 and 9a–9d. First, skip processing section 2c extracts the upper 12 bits of the address at which the instruction is stored and calculates a corresponding address by adding the offset value (step S111). For example, as shown in FIG. 9a, if an application instruction is stored at the address 014Dh, then the adding of the offset value 0500h to the upper 12 bits of the address results in the corresponding address of 0514h as shown in FIG. 9c.

Figure 9D:
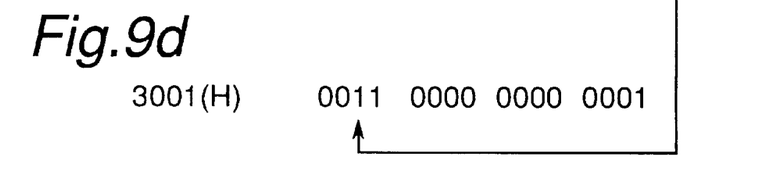
FIG. 9d is the contents at the address of FIG. 9c.

Next, skip processing section 2c reads out the contents of the corresponding address (step S112) to extract the judgment data from the contents based on the value of the lower 4 bits of the address of the application instruction (step S113). In the above example, the value of the lower 4 bits of the address of the application instruction is Dh=1101b=13d as shown in FIG. 9a. Therefore, the judgment data for the application instruction is stored in the 13th bit place at the calculated corresponding address 0514h. For example, if the contents at the corresponding address 0514h is 0011000000000001b as shown in FIG. 9d, then the 13th bit 1 is the judgment data for the instruction. Note that the bit places start at 0th place and end at 15th place from the lowest to the highest place. In this case, the judgment data for the application instruction is 1, so that the application instruction stored in 014Dh is not a skippable instruction. It is clear that, besides the value 1 in the 13th bit place, 16 values of judgment data are stored at the same corresponding address 0514h.

Figure 7:
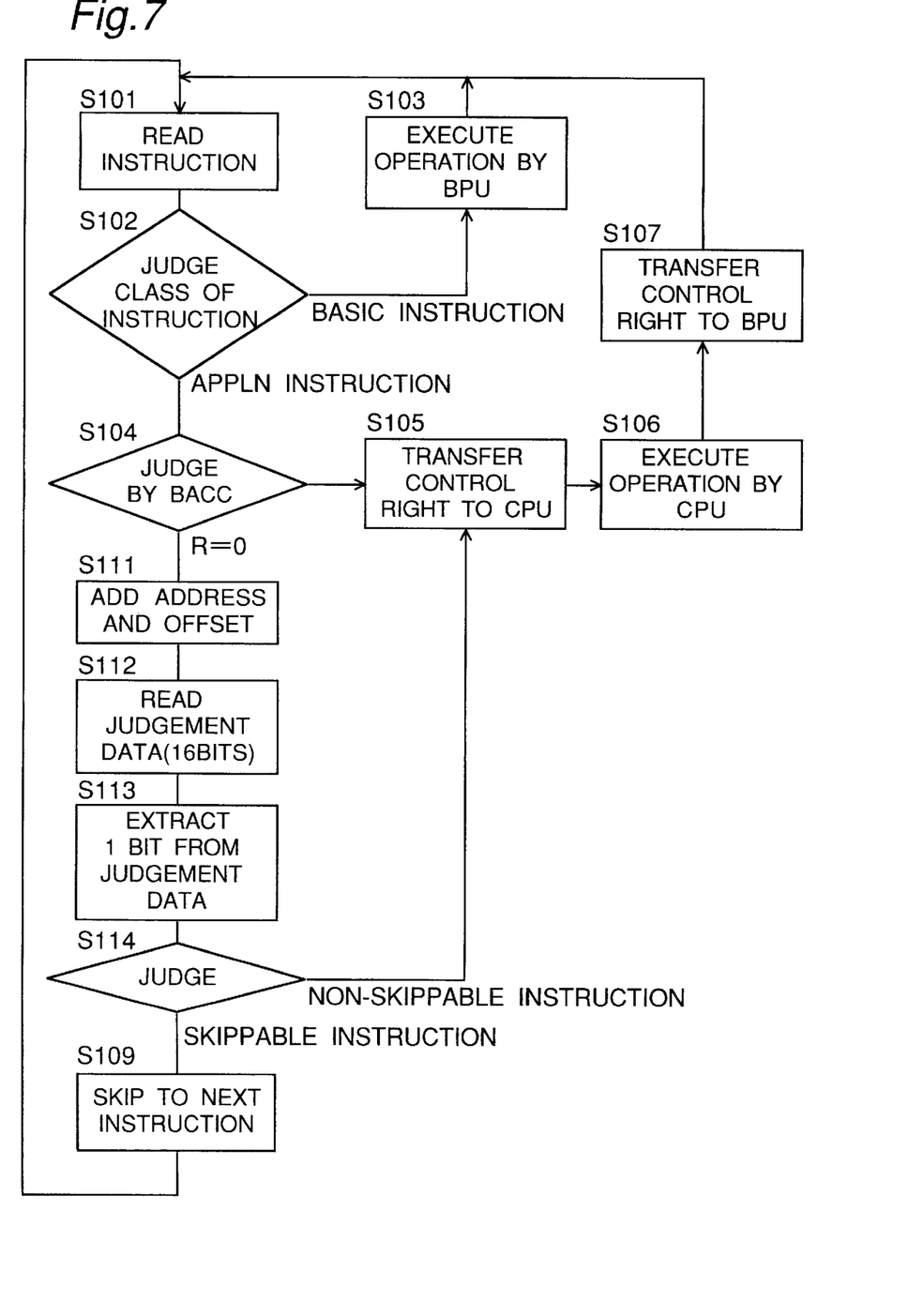
FIG. 7 is a flowchart that illustrates operations executed by the BPU in a third embodiment.

Next, the operation of BPU 2 proper and skip processing section 2c installed therein is described with reference to FIG. 7. BPU 2 operates the same as in the first embodiment except the fact that skip processing section 2c calculates the corresponding address at which judgment data is stored for a second-class instruction, as described above (step Sill), and judges whether an application instruction is a skippable instruction or not, based on the judgment data stored in judgment-data storage section 2a installed in memory 1 (steps S112, S113 and S114).

In such a programmable controller described above, the execution of a program is sped up as in the first embodiment. Also, judgment-data storage section 2a is installed in exiting memory 1, so that an extra memory does not need to be added to install judgement-data storage section 2a. Further, judgment data is stored at corresponding addresses calculated from the addresses at which instructions are stored, so that the storage area can be flexibly determined. Further, judgment data for a plurality of instructions is stored at a single address, so that the size of memory 1 does not need to be made large.

In the first embodiment, judgment-data storage section 2a is a table that lists judgment data corresponding to addresses at which instructions are stored, for referring to the table to judge whether a second-class instruction following a first-class instruction is a skippable instruction. Methods of storing the judgment data are not limited to the one described in the first embodiment. It suffices to be able to judge whether a second-class instruction is a skippable instruction or not. For example, a table listing the classes of all skippable instruction code words can be installed in judgment-data storage section 2a. In this case, BPU 2 judges whether a second-class instruction to be executed is skippable or not, by searching for the instruction code word in the table.

In the second embodiment, second memory 6 is connected to both BPU 2 and CPU 3 to be read by them. However, second memory 6 can be connected to only BPU 2 to be read thereby. Also, in the second embodiment, judgment-data storage section 2a is nothing but second memory 6, but can be installed therein as part of it. Further, in the second embodiment, second memory 2 has 1 bit length, but can be more than one bit length, if the size of second memory 2 does not become too large.

In the third embodiment, judgment data is stored at corresponding addresses calculated from addresses in memory 1, but the judgment data can be stored at independent addresses. Also, in the third embodiment, judgment data for a plurality of instructions is stored at a single address, but judgment data for different instructions can be stored at different addresses, if the size of memory 1 does not become too large.

Although the present invention has been fully described in connection with the preferred embodiments thereof and the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A programmable controller comprising:
   a bit processing unit (BPU) that executes first-class instructions;
   a central processing unit (CPU) that executes second-class instructions;
   a memory that is shared by said BPU and said CPU and stores a program, which is formed of a combination of the first-class instructions and the second-class instructions, said second-class instructions including skippable instructions that can be skipped if an operation result of a preceding instruction of the first-class instructions satisfies a predetermined skip condition;
   a judgment-data storage section that stores judgment data for judging whether a current instruction of the second-class instructions is a skippable instruction or not; and
   a skip processing section that judges whether said operation result satisfies said skip condition or not and judges whether said current instruction is a skippable instruction, based on said judgment data, said skip processing section skipping said current instruction without transferring control right to said CPU, if judging that said operation result satisfies said skip condition and that said current instruction is a skippable instruction.

2. The programmable controller as defined in claim 1 wherein said skip processing section is installed in said BPU.

3. The programmable controller as defined in claim 2 wherein said judgment-data storage section is installed in said BPU.

4. The programmable controller as defined in claim 3 wherein said judgment-data storage section stores each of said judgment data therein at an address corresponding to an address at which a corresponding one of the second-class instructions is stored in said memory.

5. The programmable controller as defined in claim 2 wherein said judgment-data storage section is installed in a second memory that is connected to and read by said BPU.

6. The programmable controller as defined in claim 5 wherein said second memory is 1 bit length.

7. The programmable controller as defined in claim 5 wherein said second memory stores each of said judgment data therein at an address corresponding to an address at which one of said second-class instructions is stored in said memory.

8. The programmable controller as defined in claim 6 wherein said second memory stores each of said judgment data therein at an address corresponding to the address at which each of said second-class instructions is stored in said memory.

9. The programmable controller as defined in claim 2 wherein said judgment-data storage section is installed in said memory.

10. The programmable controller as defined in claim 9 wherein said memory stores each of said judgment data at an address calculated from an address at which one of said second-class instructions is stored in said memory.

11. The programmable controller as defined in claim 9 wherein said memory stores a plurality of data of said judgment data at a single address.

12. The programmable controller as defined in claim 10 wherein said memory stores a plurality of data of said judgment data at a single address.

* * * * *